(12) United States Patent
Wu

(10) Patent No.: US 11,457,188 B2
(45) Date of Patent: Sep. 27, 2022

(54) METHOD AND SYSTEM FOR ADJUSTING WHITE BALANCE, AND DISPLAY

(71) Applicant: AMLOGIC (SHANGHAI) CO., LTD., Shanghai (CN)

(72) Inventor: Yong Wu, Shanghai (CN)

( * ) Notice: Subject to any disclaimer, the term of this patent is extended or adjusted under 35 U.S.C. 154(b) by 12 days.

(21) Appl. No.: 17/266,945

(22) PCT Filed: Sep. 4, 2019

(86) PCT No.: PCT/CN2019/104454
§ 371 (c)(1),
(2) Date: Feb. 8, 2021

(87) PCT Pub. No.: WO2020/048496
PCT Pub. Date: Mar. 12, 2020

(65) Prior Publication Data
US 2021/0306606 A1    Sep. 30, 2021

(30) Foreign Application Priority Data

Sep. 7, 2018   (CN) .......................... 20181104472.6

(51) Int. Cl.
| | |
|---|---|
| *H04N 9/73* | (2006.01) |
| *G06T 7/90* | (2017.01) |
| *H04N 17/02* | (2006.01) |

(52) U.S. Cl.
CPC ................ *H04N 9/73* (2013.01); *G06T 7/90* (2017.01); *H04N 17/02* (2013.01); *G06T 2207/10024* (2013.01); *G06T 2207/20021* (2013.01)

(58) Field of Classification Search
CPC . H04N 17/02; H04N 9/73; G06T 7/90; G06T 2207/10024; G06T 2207/20021
See application file for complete search history.

(56) References Cited

U.S. PATENT DOCUMENTS

| | | | | |
|---|---|---|---|---|
| 7,126,644 | B2 * | 10/2006 | Xia ........................ | H04N 9/735 348/E9.051 |
| 7,394,930 | B2 * | 7/2008 | Trimeche ............... | H04N 9/735 382/167 |

(Continued)

*Primary Examiner* — Brian P Yenke
(74) *Attorney, Agent, or Firm* — Clement Cheng

(57) ABSTRACT

The invention discloses a method and system for adjusting white balance, and a display, and belongs to the technical field of display. The method for adjusting the white balance is applied to the display, and comprises the following steps: identifying image information of a currently played frame image to be adjusted; obtaining a matched target color temperature value according to the image information; and adjusting a white balance parameter of the frame image to be adjusted according to the target color temperature value. According to the method disclosed by the invention, by identifying the image information of the currently played frame image to be adjusted, and obtaining the matched target color temperature value according to the image information, the white balance parameter of the frame image to be adjusted is automatically adjusted according to the target color temperature value, the purpose of correspondingly adjusting the white balance parameter of the currently played frame image contents in real time can be achieved, so that the sense of tableau of the image is more realistic, and the visual effect is enhanced.

8 Claims, 1 Drawing Sheet

(56) References Cited

U.S. PATENT DOCUMENTS

| | | | | |
|---|---|---|---|---|
| 8,384,796 B2* | 2/2013 | Zhang | | H04N 9/735 |
| | | | | 348/222.1 |
| 8,482,630 B2* | 7/2013 | Jeon | | H04N 9/735 |
| | | | | 348/225.1 |
| 8,724,897 B2* | 5/2014 | Adachi | | H04N 9/646 |
| | | | | 382/172 |
| 8,928,771 B2* | 1/2015 | Ouchi | | H04N 9/735 |
| | | | | 348/222.1 |
| 9,053,662 B2* | 6/2015 | Hsu | | G09G 3/006 |
| 9,135,889 B2* | 9/2015 | Marcu | | G09G 5/06 |
| 9,161,000 B2* | 10/2015 | Zhang | | H04N 17/04 |
| 9,554,109 B2* | 1/2017 | Yao | | H04N 1/6077 |
| 9,686,537 B2* | 6/2017 | Geiss | | G06T 7/90 |
| 10,055,823 B2* | 8/2018 | Chang | | H04N 17/02 |
| 10,070,052 B2* | 9/2018 | Fukui | | G06V 40/161 |
| 10,303,983 B2* | 5/2019 | Tsunoda | | G06K 9/6267 |
| 10,321,110 B2* | 6/2019 | Jiang | | G06T 7/90 |
| 10,546,522 B2* | 1/2020 | Nakai | | G06F 3/04847 |
| 10,757,386 B2* | 8/2020 | Hsiao | | G06T 7/11 |
| 10,805,588 B2* | 10/2020 | Wang | | H04N 9/735 |
| 11,062,636 B1* | 7/2021 | Fu | | G09G 3/2003 |
| 11,113,850 B2* | 9/2021 | Kim | | H04N 9/74 |
| 11,127,333 B1* | 9/2021 | Fu | | H04N 9/73 |
| 11,277,595 B2* | 3/2022 | Yuan | | G06T 7/13 |
| 2002/0110372 A1* | 8/2002 | Fields | | H04N 1/6086 |
| | | | | 396/287 |
| 2005/0007463 A1* | 1/2005 | Xia | | H04N 9/73 |
| | | | | 348/E9.051 |
| 2005/0174359 A1* | 8/2005 | Yu | | H04N 9/67 |
| | | | | 345/589 |
| 2005/0243175 A1* | 11/2005 | Yamada | | H04N 9/735 |
| | | | | 348/E5.038 |
| 2007/0285378 A1* | 12/2007 | Lankhorst | | G09G 3/342 |
| | | | | 345/102 |
| 2008/0303918 A1* | 12/2008 | Keithley | | G09G 3/20 |
| | | | | 348/223.1 |
| 2009/0207274 A1* | 8/2009 | Park | | H04N 9/735 |
| | | | | 348/E5.031 |
| 2010/0091039 A1* | 4/2010 | Marcu | | G09G 5/06 |
| | | | | 345/690 |
| 2014/0168463 A1* | 6/2014 | Tamura | | H04N 9/735 |
| | | | | 348/223.1 |
| 2017/0237961 A1* | 8/2017 | Barron | | G06T 5/001 |
| | | | | 348/223.1 |
| 2019/0320152 A1* | 10/2019 | Hsiao | | H04N 9/73 |
| 2020/0336657 A1* | 10/2020 | Kim | | G06V 10/56 |
| 2021/0281809 A1* | 9/2021 | Kinuwaki | | G05D 1/0246 |

* cited by examiner

METHOD AND SYSTEM FOR ADJUSTING WHITE BALANCE, AND DISPLAY

BACKGROUND OF THE INVENTION

1. Field of the Invention

The invention relates to the technical field of display, and more particularly, to a method and a system for adjusting white balance and a display.

2. Description of the Related Art

White balance is a setting of restoring colors of an object rendered in different light source conditions to the inherent color of the object, that is, an image is normalized under different color temperature conditions to achieve "white become white." The white balance parameters are different under different color temperature conditions. At present, the white balance parameters of TVs are fixed.

Color temperature is a performance index of the TV When the light source emits light, it will produce a set of spectra. A certain temperature, which is required for producing the same spectrum with a pure black body, is the color temperature of the light source. Almost all the TVs available on the market have the function of adjusting the color temperature. The presence of the function (generally, three options of color temperature are available, 9300K, 6500K, and 5000K makes it possible for the color of a display to meet high standard operation requirements.

The color temperature is a unit of measurement that indicates color components in light. Theoretically, the color temperature refers to the color of the black body rendered after it is heated from absolute zero (−273° C.). After heated, the black body gradually turns from black to red, then turns from red to yellow, and turns from yellow to white, finally, it emits blue light. When heated to a certain temperature, light emitted by the black body contain a spectral component called the color temperature under this temperature, and the unit of measurement is "K" (Kelvin). If the light emitted by a certain light source has the same spectral component contained in the light emitted by the black body at a certain temperature, and the spectral component is called a K color temperature.

Generally, TV series are shot with high-definition cameras and recorded on tapes. There are many ways to shoot movies. Conventionally, movies are shot on film (e.g., standard 35 mm film, IMAX 70 mm film for foreign documentaries, and 16 min film which is rarely used); some may be shot on Alei Elisa camera or on a Sony/Panosonic high-definition camera, and some of those movies are recorded on film or stored on hard disk or tape in digital format. Color correction is not a key part in the late stage of the TV series, so the early stage shooting of the TV series tends to be narrative, and image requirements are not high. However, movie shooting aims to reserve more light and dark information for the purpose of reserving space for movie's postproductions. Therefore, different cameras are used for the intended purposes, and the visual effects of the movie are also different. Moreover, since postproductions and debugging are involved, and directors have different intensions, different movies and TV series may use different color temperatures. However, at present, the color temperature has to be manually adjusted on the menu of the television. As a result, the actual color temperature of the movie and TV series does not match the color temperature and the white balance parameter of the TV, which leads to the situation that scenes on the TV appear to be not realistic and the visual effects are poor.

SUMMARY OF THE INVENTION

Given that the foregoing problems exist in the prior art, the present invention provides a method and a system for adjusting white balance and a display. The method the system mentioned herein can automatically identify a matched color temperature according to image information, so as to adjust a white balance parameter.

A method for adjusting white balance, which is applied to a display, and which comprises the following steps:

identifying image information of a currently played frame image to be adjusted;

obtaining a matched target color temperature value according to the image information; and adjusting a white balance parameter of the frame image to be adjusted according to the target color temperature value.

Preferably, the step of identifying image information of the currently played frame image to be adjusted comprises:

dividing the currently played frame image to be adjusted into a preset number of image blocks;

obtaining a target number of white blocks with the largest proportion of the color temperature value among the preset number of image blocks; and obtaining a target number of color blocks with the largest proportion of the color temperature value of the color blocks among the preset number of image blocks according to the number of the color blocks corresponding to each preset color temperature value.

Preferably, the step of obtaining a target number of white blocks with the largest proportion of the color temperature value among the preset number of image blocks comprises:

generating a three-dimensional curve for the white balance color temperature according to the white balance parameter of the display at at least three color temperature values;

calculating a mean value of components of each white block in a RGB channel, and obtaining a color temperature value of each white block according to the mean value of the component of the white block in the RGB channel and the three-dimensional curve for the white balance color temperature; and counting the number of the white blocks corresponding to each color temperature value in the preset number of image blocks according to the color temperature value corresponding to each white block, to obtain a target number of white blocks with the largest proportion of the color temperature value.

Preferably, the step of generating a three-dimensional curve for the white balance color temperature according to the white balance parameters of the display under at least three color temperature values comprises:

obtaining a red gain and a blue gain of the display at each color temperature value; and generating a three-dimensional curve for the white balance color temperature by using an interpolation method, according to the red gain and the blue gain corresponding to each color temperature value.

Preferably, the step of obtaining a matched target color temperature value according to the image information comprises:

comparing the target number of the white blocks and the target number of the color blocks, to obtain a color temperature value corresponding to image blocks whose target number is greater than that of the remaining image blocks, and the color temperature value refers to the target color temperature value.

The invention further provides a system for adjusting white balance, which is applied to a display, and which comprises:

an identifying unit for identifying image information of a currently played frame image to be adjusted;

an obtaining unit for obtaining a matched target color temperature value according to the image information; and an adjusting unit for adjusting a white balance parameter of the frame image to be adjusted according to the target color temperature value.

Preferably, the identifying unit comprises:

a division unit for dividing the currently played frame image to be adjusted into a preset number of image blocks;

a first obtaining module for obtaining a target number of white blocks with the largest proportion of the color temperature value among the preset number of image blocks; and a second obtaining module for obtaining a target number of color blocks with the largest proportion of the color temperature value of the color blocks among the preset number of image blocks according to the number of the color blocks corresponding to a preset color temperature value.

Preferably, the first obtaining module is configured to generate a three-dimensional curve for the white balance color temperature according to the white balance parameter of the display under at least three color temperature values;

the first obtaining module is further configured to calculate a mean value of components of each white block in a RGB channel, and obtaining a color temperature value of each white block according to the mean value of the component of the white block in the RGB channel and the three-dimensional curve for the white balance color temperature; and the first obtaining module is further configured to count the number of the white blocks corresponding to each color temperature value in the preset number of image blocks according to the color temperature value corresponding to each white block, to obtain a target number of white blocks with the largest proportion of the color temperature value.

Preferably, the obtaining unit is configured to compare the target number of the white blocks and the target number of the color blocks, to obtain a color temperature value corresponding to image blocks whose target number is greater than that of the remaining image blocks, and the color temperature value refers to the target color temperature value.

The invention further comprises a display comprising the above-mentioned system for adjusting white balance.

By adopting the above-mentioned technical solutions, the present invention has the following beneficial effects:

according to the method disclosed by the invention, by identifying the image information of the currently played frame image to be adjusted, and obtaining the matched target color temperature value according to the image information, the white balance parameter of the frame image to be adjusted is automatically adjusted according to the target color temperature value, the purpose of correspondingly adjusting the white balance parameter of the currently played frame image contents in real time can be achieved, so that the sense of tableau of the image is more realistic, and the visual effect is enhanced.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

The technical solution set forth in the embodiments of the present invention will now be described clearly and fully hereinafter with reference to the accompanying drawings of the embodiments of the present invention. Obviously, such embodiments provided in the present invention are only part of the embodiments instead of all embodiments. It should be understood that all the other embodiments obtained from the embodiments set forth in the present invention by one skilled in the art without any creative work fall within the scope of the present invention.

Notably, the embodiments set forth in the present invention and features of the embodiments may be combined in any suitable manner.

The present invention will be described hereinafter with reference to the accompanying drawings and particular embodiments, but the invention is not limited thereto.

Figure 1:
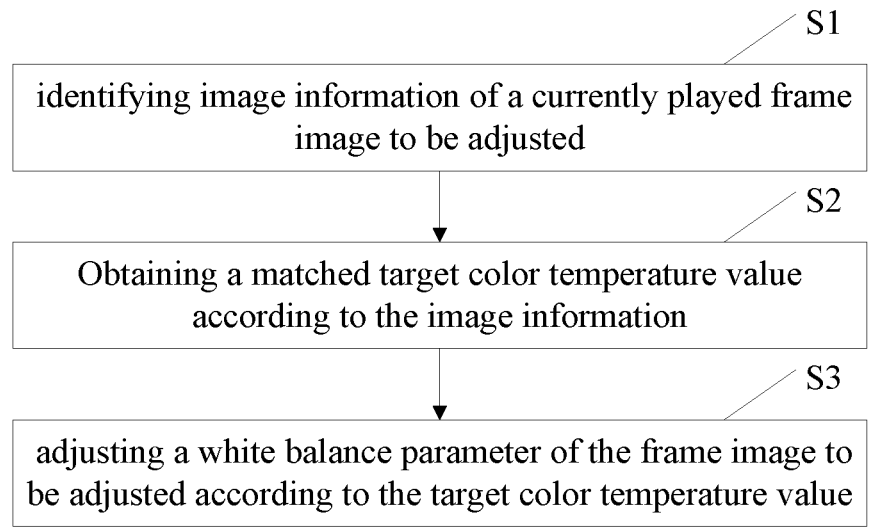
FIG. 1 is a flow chart for a method for adjusting white balance according to the present invention.

As shown in FIG. 1, a method for adjusting white balance, which is applied to a display, and which comprises the following steps:

Step S1, identifying image information of a currently played frame image to be adjusted;

Step S2, obtaining a matched target color temperature value according to the image information; and Step S3, adjusting a white balance parameter of the frame image to be adjusted according to the target color temperature value.

It should be noted that the method for adjusting white balance can be applied to a display, but can also be applied to a TV.

In this embodiment, by identifying the image information of the currently played frame image to be adjusted, and obtaining the matched. target color temperature value according to the image information, the white balance parameter of the frame image to be adjusted is automatically adjusted according to the target color temperature value, the purpose of correspondingly adjusting the white balance parameter of the currently played frame image contents in real time can be achieved, so that the sense of tableau of the image is more realistic, and the visual effect is enhanced.

In a preferred embodiment, the Step S1 of identifying image information of the currently played frame image to be adjusted comprises:

S11, dividing the currently played frame image to be adjusted into a preset number of image blocks to obtain a color temperature value for each block of image; S12, obtaining a target number of white blocks with the largest proportion of the color temperature value among the preset number of image blocks.

The following description is intended for purposes of illustration only and is not intended to limit the scope of the invention, the frame image to be adjusted is segmented by using the local dimming technique.

In a preferred embodiment, the Step S12 of obtaining a target number of white blocks with the largest proportion of the color temperature value among the preset number of image blocks comprises:

generating a three-dimensional curve for the white balance color temperature according to the white balance parameters of the display under at least three color temperature values, comprising:

obtaining a red gain and a blue gain of the display at each color temperature value;

generating a three-dimensional curve for the white balance color temperature by using an interpolation method, according to the red gain and the blue gain corresponding to each color temperature value.

In this embodiment, given that size, resolution, brightness and chromaticity and other factors of the TVs may be different, each TV has its own white balance parameters. Common white balance parameters used in the TVs are listed as follows: R (Red) gain, G (Green) gain, B (Blue) gain, R offset, U offset, and B offset. Since offset, one of the white balance parameters, has small impact on the white balance, the offset can be set to a default value by using the gain. G has a greater effect on the brightness, so the white balance parameters are adjusted by adjusting R and B.

The following description is intended for purposes of illustration only and is not intended to limit the scope of the invention, obtaining the values of the white balance parameters, R gain and B gain of the TV at the seven color temperatures of 6500/7500/8500/9300/1000/11000/12000 to obtain 7 sets of correction parameters (i.e, R gain, B gain), the 7 sets of correction parameters obtain a white balance color temperature three-dimensional curve through an interpolation method. The white balance color temperature three-dimensional curve consists of the R gain, the B gain, and the color temperature.

calculating a mean value of components of each white block in a RGB channel, and obtaining a color temperature value of each white block according to the mean value of the component of the white block in the RGB channel and the three-dimensional curve for the white balance color temperature; and counting the number of the white blocks corresponding to each color temperature value in the preset number of image blocks according to the color temperature value corresponding to each white block, to obtain a target number of white blocks with the largest proportion of the color temperature value.

It should be noted that all the white blocks mentioned in the above steps are effective white blocks.

In this embodiment, the frame image to be adjusted is segmented into M×N (M and N are positive integrals) blocks, for example.

First of all, counting the number of the white blocks in the M×N blocks and a mean value of components of each white block in a RGB channel;

then, obtaining the effective white blocks according to the R gain and the B gain (gray blocks are ineffective white blocks);

obtaining a color temperature value of each effective white block according to the white balance color temperature three-dimensional curve, and obtaining the color temperature value of the white blocks with the largest proportion of the color temperature, wherein the current color temperature value is the color temperature value of the white blocks.

For example, there are 100 effective white blocks in 25×25=625 blocks, wherein the color temperature value of 80 white blocks is 9300K, that is, the color temperature value of the white block with the largest proportion of the color temperature value is 9300K.

S13, obtaining a target number of color blocks with the largest proportion of the color temperature value of the color blocks among the preset number of image blocks according to the number of the color blocks corresponding to each preset color temperature value.

Furthermore, the preset color temperature value comprises at least three values;

when the preset color temperature value comprises three values, the preset color temperature value comprises 6500K, 9300K, and 12000K.

In this embodiment, the number of the white blocks is obtained, and the remaining are color blocks with color information (i.e., color areas). The color areas can count the proportions of the three colors, R, G and B, and can divide the three colors into 6 blocks of main colors, RED, GREEN, BLUE, CYAN, MAGENTA, and YELLOW. The trend of the color tone of the color is Obtained by getting the proportions of the six main primary colors. RED and YELLOW are oriented as warm color (6500K), BLUE and CYAN are oriented as cold color (12000K), MAGENTA and GREEN are oriented as 9300K. Matching each color block with three color temperature values, obtaining the color temperature value with the largest proportion of the color block, and counting the number of color blocks corresponding to the color temperature value (i.e., the target number of color blocks).

In a preferred embodiment, the Step S2 of obtaining a matched target color temperature value according to the image information comprises:

comparing the target number of the white blocks and the target number of the color blocks, to obtain a color temperature value corresponding to image blocks whose target number is greater than that of the remaining image blocks, and the color temperature value refers to the target color temperature value.

In this embodiment, the size of target number of white blocks is compared with the size of target number of color blocks, the target number with a larger value is selected, and the color temperature value of the image blocks corresponding to the target number of the image blocks with the larger value is considered as the target color temperature value, so as to adjust the white balance parameter of the display under this color temperature value. Therefore, the purpose of automatically adjusting the white balance parameter of the image contents when playing the image can be achieved, so that the sense of tableau of the image is more realistic, the visual effect of users is enhanced, and the original scenario effects of images are restored.

Figure 2:
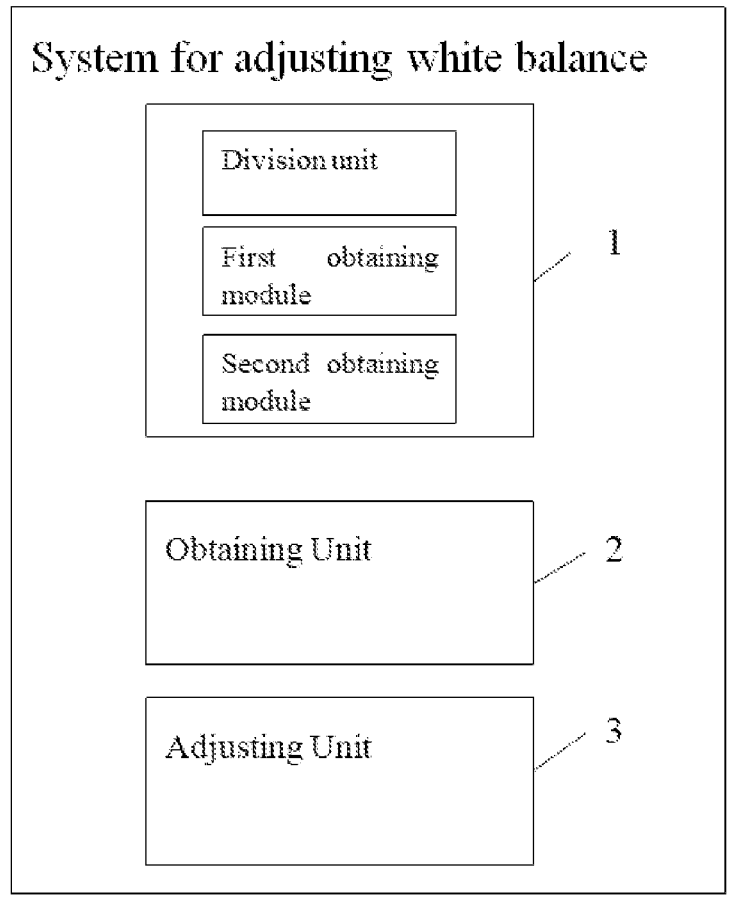
FIG. 2 is a block diagram of a system for adjusting white balance according to an embodiment of the present invention.

As shown in FIG. 2, the invention further provides a system for adjusting white balance, which is applied to a display, and which comprises:

an identifying unit 1 for identifying image information of a currently played frame image to be adjusted;

an obtaining unit 2 for obtaining a matched target color temperature value according to the image information; and an adjusting unit 3 for adjusting a white balance parameter of the frame image to be adjusted according to the target color temperature value.

It should be noted that the system for adjusting white balance can be applied to a TV, and can also be applied to a display the system can be configured to adjust a white balance parameter of an image when a TV play is playing on the TV; and the white balance parameter of the image is adjusted according to the image contents displayed on the display.

In this embodiment, by identifying the image information of the currently played frame image to be adjusted, and obtaining the matched target color temperature value according to the image information, the white balance parameter of the frame image to be adjusted is automatically adjusted according to the target color temperature value, the purpose of correspondingly adjusting the white balance parameter of the currently played frame image contents in real time can be achieved, so that the sense of tableau of the image is more realistic, and the visual effect is enhanced.

In a preferred embodiment, the identifying unit 1 comprises:

a division unit for dividing the currently played frame image to be adjusted into a preset number of image blocks;

a first obtaining module for obtaining a target number of white blocks with the largest proportion of the color temperature value among the preset number of image blocks; and a second obtaining module for obtaining a target number of color blocks with the largest proportion of the color temperature value of the color blocks among the preset number of image blocks according to the number of the color blocks corresponding to a preset color temperature value.

Furthermore, the first obtaining module is configured to generate a three-dimensional curve for the white balance color temperature according to the white balance parameters of the display under at least three color temperature values;

the first obtaining module is further configured to calculate a mean value of components of each white block in a RGB channel, and obtaining a color temperature value of each white block according to the mean value of the component of the white block in the RGB channel and the three-dimensional curve for the white balance color temperature; and the first obtaining module is further configured to count the number of the white blocks corresponding to each color temperature value in the preset number of image blocks according to the color temperature value corresponding to each white block, to obtain a target number of white blocks with the largest proportion of the color temperature value.

In a preferred embodiment, the obtaining unit 2 is configured to compare the target number of the white blocks and the target number of the color blocks, to obtain a color temperature value corresponding to image blocks whose target number is greater than that of the remaining image blocks, and the color temperature value refers to the target color temperature value.

The invention further comprises a display comprising the above-mentioned system for adjusting white balance.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A method for adjusting white balance, which is applied to a display, and which comprises the following steps:
   identifying image information of a currently played frame image to be adjusted;
   obtaining a matched target color temperature value according to the image information; and
   adjusting a white balance parameter of the frame image to be adjusted according to the target color temperature value;
   wherein the step of identifying image information of the currently played frame image to be adjusted comprises:
   dividing the currently played frame image to be adjusted into a preset number of image blocks;
   obtaining a target number of white blocks with the largest proportion of the color temperature value among the preset number of image blocks; and
   obtaining a target number of color blocks with the largest proportion of the color temperature value of the color blocks among the preset number of image blocks according to the number of the color blocks corresponding to each preset color temperature value.

2. The method for adjusting white balance of claim 1, wherein the step of obtaining a target number of white blocks with the largest proportion of the color temperature value among the preset number of image blocks comprises:
   generating a three-dimensional curve for the white balance color temperature according to the white balance parameters of the display under at least three color temperature values;
   calculating a mean value of components of each white block in a RGB channel, and obtaining a color temperature value of each white block according to the mean value of the component of the white block in the RGB channel and the three-dimensional curve for the white balance color temperature; and
   counting the number of the white blocks corresponding to each color temperature value in the preset number of image blocks according to the color temperature value corresponding to each white block, to obtain a target number of white blocks with the largest proportion of the color temperature value.

3. The method for adjusting white balance of claim 2, wherein the step of generating a three-dimensional curve for the white balance color temperature according to the white balance parameters of the display under at least three color temperature values comprises:
   obtaining a red gain and a blue gain of the display at each color temperature value; and
   generating a three-dimensional curve for the white balance color temperature by using an interpolation method, according to the red gain and the blue gain corresponding to each color temperature value.

4. The method for adjusting white balance of claim 1, wherein the step of obtaining a matched target color temperature value according to the image information comprises:
   comparing the target number of the white blocks and the target number of the color blocks, to obtain a color temperature value corresponding to image blocks whose target number is greater than that of the remaining image blocks, and the color temperature value refers to the target color temperature value.

5. A system for adjusting white balance, which is applied to a display, and which comprises:
   an identifying unit for identifying image information of a currently played frame image to be adjusted;
   an obtaining unit for obtaining a matched target color temperature value according to the image information; and
   an adjusting unit for adjusting a white balance parameter of the frame image to be adjusted according to the target color temperature value;
   wherein the identifying unit comprises:
   a division unit for dividing the currently played frame image to be adjusted into a preset number of image blocks;
   a first obtaining module for obtaining a target number of white blocks with the largest proportion of the color temperature value among the preset number of image blocks; and a second obtaining module for obtaining a target number of color blocks with the largest proportion of the color temperature value of the color blocks among the preset member of image blocks according to the number of the color blocks corresponding to a preset color temperature value.

6. The system for adjusting white balance of claim 5, wherein the first obtaining module is configured to generate a three-dimensional curve for the white balance color temperature according to the white balance parameters of the display under at least three color temperature values;

the first obtaining module is further configured to calculate a mean value of components of each white block in a RGB channel, and obtaining a color temperature value of each white block according to the mean value of the component of the white block in the RGB channel and the three-dimensional curve for the white balance color temperature; and the first obtaining module is further configured to count the number of the white blocks corresponding to each color temperature value in the preset number of image blocks according to the color temperature value corresponding to each white block, to obtain a target number of white blocks with the largest proportion of the color temperature value.

7. The system for adjusting white balance of claim 5, wherein the obtaining unit is configured to compare the target number of the white blocks and the target number of the color blocks, to obtain a color temperature value corresponding to image blocks whose target number is greater than that of the remaining image blocks, and the color temperature value refers to the target color temperature value.

8. A display comprising the system for adjusting white balance of claim 5, or 6, or 7.

* * * * *